United States Patent [19]

Donatelli et al.

[11] 4,230,975
[45] Oct. 28, 1980

[54] CONTROL CIRCUIT ARRANGEMENT FOR DC MOTORS

[75] Inventors: Paul C. Donatelli, Trafford, Pa.; Kenneth G. Main, Newburgh, Ind.

[73] Assignee: Aluminum Company of America, Pittsburgh, Pa.

[21] Appl. No.: 893,006

[22] Filed: Apr. 3, 1978

[51] Int. Cl.³ .............................................. H02P 5/00
[52] U.S. Cl. .................................... 318/6; 318/331; 318/338; 318/342
[58] Field of Search .................. 318/6, 302, 338, 339, 318/342, 336, 350, 375, 377, 381, 499, 331, 405, 410

[56] References Cited

U.S. PATENT DOCUMENTS

| | | | |
|---|---|---|---|
| 4,019,107 | 4/1977 | Dixon et al. | 318/493 |
| 4,079,301 | 3/1978 | Johnson | 318/331 |

FOREIGN PATENT DOCUMENTS 155793  12/1952  Australia .................................. 318/6

*Primary Examiner*—J. V. Truhe
*Assistant Examiner*—John W. Redman
*Attorney, Agent, or Firm*—Elroy Strickland

[57] ABSTRACT

Means and method for controlling the power delivered to the shaft of a DC motor when the field of the motor becomes saturated and prevents control of armature voltage by the field of the motor. The method involves the step of increasing the current in the armature by an amount corresponding to the decrease in the voltage of the armature caused by a decrease in the speed of the armature during saturation of the field. Increasing armature current is effective to maintain power output of the motor constant. If the speed of the armature increases after the occurrence of saturation, the voltage of the armature increases, such that the method includes the additional step of decreasing armature current in proportion to the increasing armature voltage to maintain constant power output of the motor.

3 Claims, 4 Drawing Figures

CONTROL CIRCUIT ARRANGEMENT FOR DC MOTORS

BACKGROUND OF THE INVENTION

The present invention relates generally to maintaining the power of a DC motor constant when the armature thereof is changing speed, and particularly to maintaining constant power when the field of the motor becomes saturated.

In the context of the following description, the word "saturation" refers to the condition in which the iron structure of a motor field is fully, physically saturated with magnetic flux, as opposed to the intermediate condition that occurs between full saturation of the iron and the condition that produces linear increases in field flux in response to linear increases in field current.

In reducing the gauge of material in a rolling mill, for example, it is necessary that a proper and constant tension be maintained on the material entering and leaving the mill. If proper tension into the mill is not maintained, the material tends to wander from the centerline of the mill which, in turn, can cause buckling and damage to the edges of the wandering material. If the tension on the material leaving the mill is not properly maintained, as the material winds on a rewind or take-up reel, the material tends to wind on the reel in a telescoping fashion, i.e., each successive wrap of the material on the rewind reel displaces itself laterally from the previous wrap.

As a coil of material winds or unwinds, the diameter and radius of the coil changes. The changes in diameter, of course, directly result in changes in the rotational speed of the coil, with constant linear speed of the material leaving or entering the coil of material. In addition, a decreasing radius causes an increasing force and tension on the material being pulled from the coil because the mechanical advantage or lever offered to the mill by the coil radius in the process of pulling the material from the coil is decreasing, thereby providing a motor driving the coil with the increasing ability to resist the pull of the mill. Because of the changing speed and tension experienced in unwind and rewind processes, coils of material are usually driven by DC motors controlled in a manner that maintains proper tension on the material. One system providing such control in a rolling process involves the development of a signal representing the rate of travel of the material through the mill and the voltage measured across the armature of the motor, the armature being mechanically connected to the reel and coil. As the rate of rotation of the coil increases (in an unwinding process), the rate of rotation of the armature increases such that the voltage across the armature increases. The signal developed from armature voltage and the rate of material travel is employed to counter the rising voltage in the armature by reducing the amount of current supplied to the field and thus the magnetic flux of the field. The net effect of this counteraction is to keep the armature voltage at a constant value but proportional to the speed of the sheet. (The current supplied to the armature of the motor is held constant by an independent power supply). In addition, because of the decreasing current and flux in the field, the torque of motor is decreasing. In this manner, the torque applied to the shaft of the motor varies inversely with the speed of the motor and therefore the diameter of the coil so that the force applied to the coil of material, as it is pulled from the coil, is maintained constant. Since both the current supplied to the armature and its voltage are constant, the power developed by the armature is held constant.

Another arrangement for controlling force on an unwind or rewind reel, via control of a DC motor, is disclosed in U.S. Pat. No. 3,749,988 to Pittner. Pittner is concerned with extending the range of motor speed associated with coils of material as they approach minimum diameters in the process of paying off the material of a coil, or at the beginning of the take-up process, when diameter of the coil is quite small. On such occasions the speed of the motor approaches the upper limit of its speed range in the process of maintaining proper tension on the material being paid off or taken-up. Increases in motor speed above this limit endanger the motor since motors have design limitations. The speed of the motor in the Pittner disclosure is controlled by measuring the diameter of the coil of material being driven by the motor and adjusting flux in the motor field as a function of the latest measurement of coil diameter during the period of time the diameter is greater than a small, finite diameter; during this time armature current is maintained constant. When, however, the latest measurement of diameter is equal to or below the finite diameter, field flux is held constant and the operator reduces line speed so that the motor will not exceed its highest rated voltage and speed. When line speed is reduced, armature current is readjusted downwardly to reflect such lower speed.

SUMMARY OF THE INVENTION

The present invention involves an arrangement in which the power directed to the shaft of a DC motor is maintained constant when the speed of the motor is reduced to the extent that the iron of the motor field is substantially fully saturated with magnetic flux. The field saturates because of automatic increases in field current effected by controls associated with the motor, such controls attempting to offset the decrease in armature voltage caused by the decrease in motor speed, as explained in detail hereafter. The automatic controls act in this manner, for example, when the reductions taken on material in a rolling mill are substantially increased, i.e., are increased beyond the reductions for which the motor and reel were designed. With such an increase in the reduction taken, the rate of travel of the material from the unwind coil slows substantially, thereby slowing the rotation of the armature of the drive motor.

Saturation of a motor field can also occur when the diameter of the reel containing the coil and/or the diameters of the coils of material themselves are increased substantially, such that the rate of rotation of the reel and coil is substantially slowed.

In the present invention, motor power is maintained constant when the field of the motor saturates, due to decreases in rotational speed of the armature, thereby resulting in decreases in armature voltage, and during the period of such saturation, by increasing the current in the armature by amounts corresponding to the decreases in armature voltage. Thereafter, if the speed of the armature increases, thereby increasing the voltage of the armature, current in the armature is decreased in proportion to the increase in armature voltage to maintain motor horsepower constant. Otherwise, such an increasing armature voltage provides an increasing power output and a constant torque for the motor, which torque should be decreasing with the decreasing radius of the coil. With a constant torque the force on the material increases as it unwinds since the motor has the increasing ability to resist the pull of the mill, as explained earlier.

In the case of a rewind reel and coil of material, when the diameter of coil increases and the rotation of the armature is slowed to the extent that the field of the motor saturates, the invention (again) increases current in the armature by the amount of the decrease in armature voltage due to saturation, and maintains this relationship until the coil of the material is completed on the rewind reel.

THE DRAWINGS

The objectives and advantages of the invention will best be understood from consideration of the following detailed description and the accompanying drawings in which.

PREFERRED EMBODIMENT OF THE INVENTION

Figure 1:
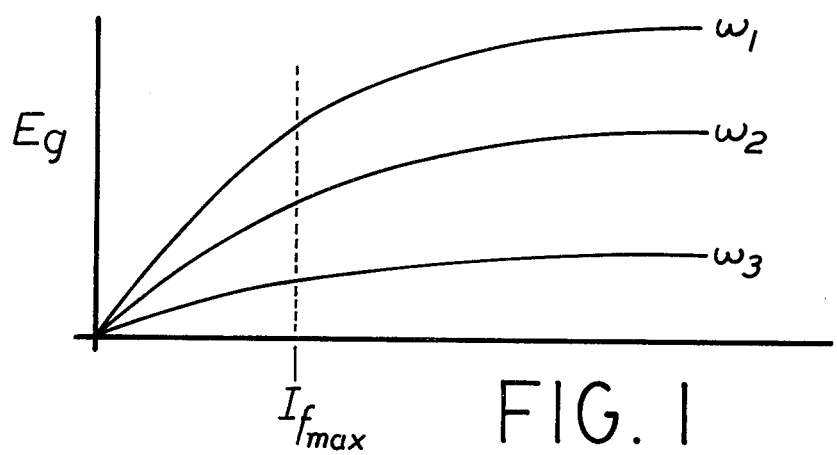
FIG. 1 shows three curves expressing the wellknown phenomenon of the leveling off of armature voltage $E_g$ when the field of a DC motor becomes saturated.

Referring now to the drawings, FIG. 1 shows the point ($I_f$ max.) at which control of the field of a DC motor (such as field 2 of motor 4 in FIG. 3) begins to be ineffective in controlling armature voltage $E_g$ and armature speed $\omega$ because of the saturation of the field with magnetic flux. Without saturation, changes in the armature voltage $E_g$ are linear with corresponding changes in field current $I_f$ for any given armature speed $\omega$.

Figure 2:
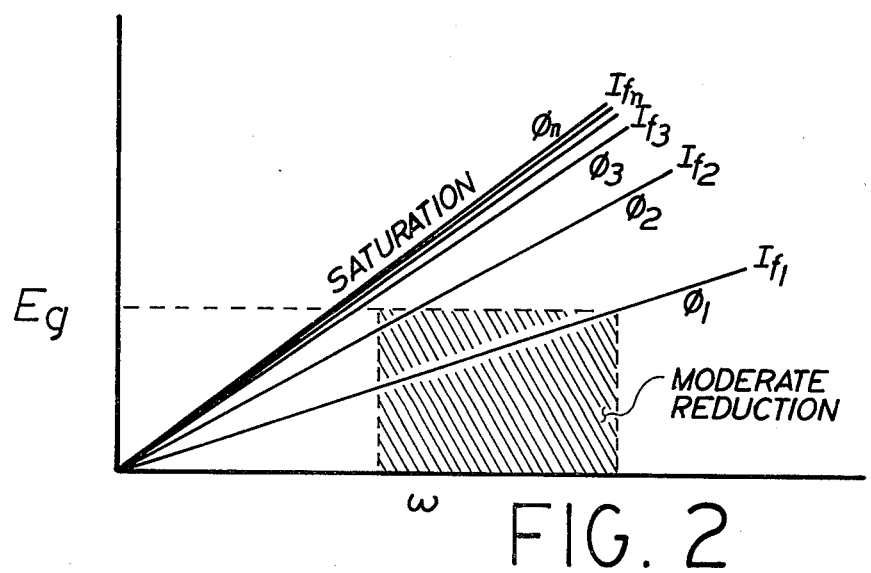
FIG. 2 is a family of curves representing the current in the field of a DC motor, the amount of current establishing the relationship of armature speed to armature voltage of the motor.
Figure 3:
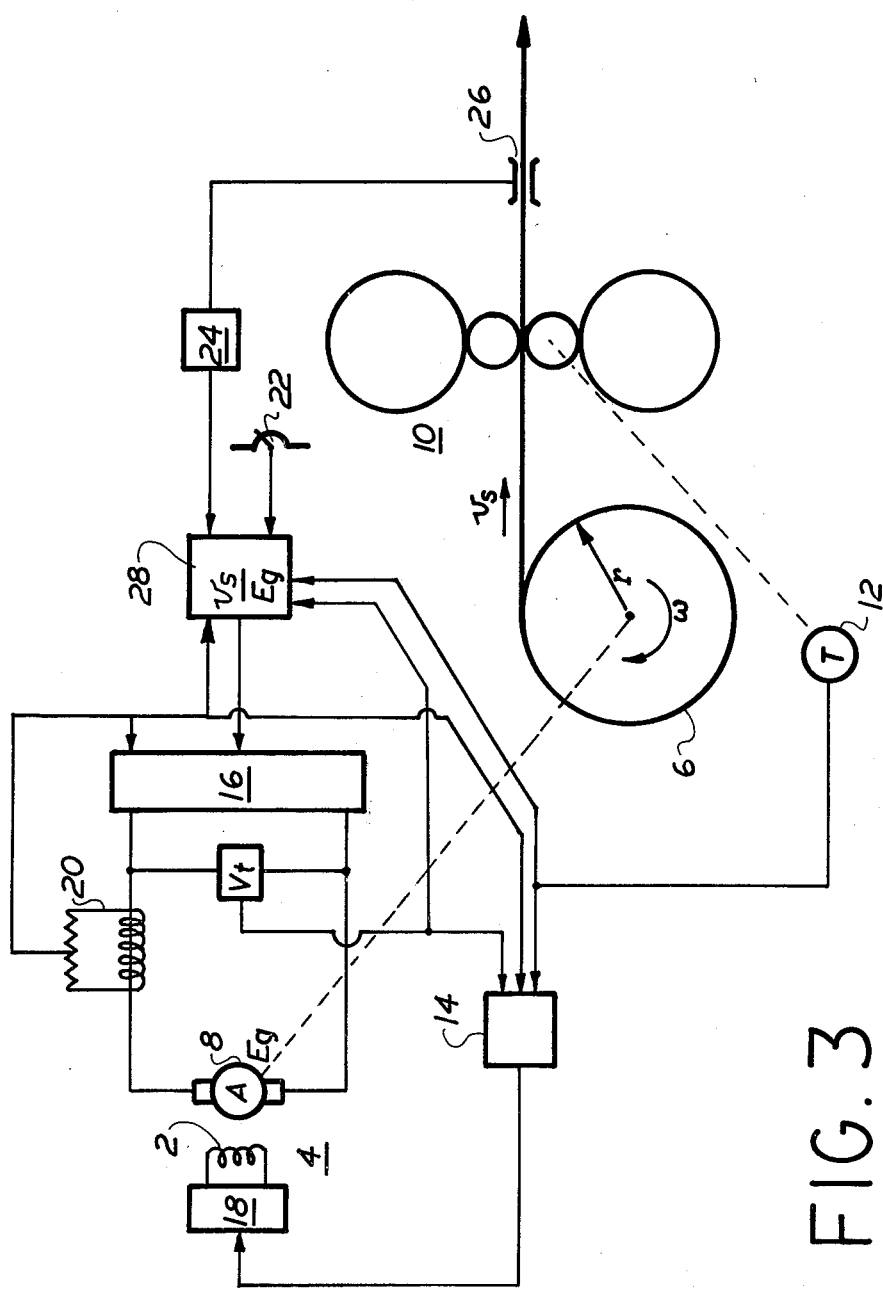
FIG. 3 is a schematic diagram of a first embodiment of the invention in which constant power output of a DC motor is provided when the field thereof is saturated.

FIG. 2 of the drawings presents a family of curves representing electrical current $I_f$ and the magnetic flux $\phi$ in the field of DC motor, such as the motor in FIG. 3. The curves show the relationship of the rotational speed $\omega$ of a coil of material 6 (mechanically connected to motor armature 8 in FIG. 3, as indicated by the dash line connecting 6 and 8) and a voltage $E_g$ developed across armature 8 of the motor when the windings thereof move through the flux of field 2. In the process of paying off material from coil 6, for example, the coil increases in rotational speed $\omega$ and the voltage $E_g$ increases if field current is constant until the reel (not shown) on which the coil is being unwound is empty. The increase in rotational speed (and armature voltage) occurs because of the decreasing diameter of the coil. In order to maintain power output of the motor constant, and provide a constant force of the material being paid off, the armature voltage and current must be kept constant. Armature voltage ($E_g$) can be kept constant by decreasing field current and flux with increasing armature speed, as indicated by the curves in FIG. 2. As discussed above and hereinafter, $E_g$ reflects the interaction of the turns of wire of the armature cutting the flux produced by the field but is masked by resistive and inductive losses associated with the wire turns of the armature. Thus, $E_g$ is an internal voltage condition of the armature that is not itself available for measurement.

In FIG. 3, coil 6 is shown as a supply of sheet or strip material for a rolling mill 10. If the mill rotates coil 6 by pulling the material from the coil, the coil rotates armature 8 such that the motor 4 functions as a generator, i.e., the windings of the armature rotate through the flux of field 2 to produce armature voltage $E_g$; the amount of this voltage (again) is dependent upon the speed of rotation of armature 8 and coil 6, and the amount of flux established in the field 2 of the motor.

Because of the finite dimensions of any given iron structure, the structure can conduct only a given, finite amount of magnetic flux. Thus, with saturation of the iron in the field of a motor, further increases in field current do not provide corresponding increases in the magnetic flux produced by the field. Rather, the flux levels off, as indicated by congestion of the plots of field current and flux $\phi$ in FIG. 2; this congestion is labeled "saturation."

As explained earlier, a cause of saturation of the field of a DC motor driving a coiled supply of material for a rolling mill, such a shown in FIG. 3, is a substantial increase in the reduction taken on the material by the work rolls of the mill. Such a reduction slows substantially the rotation of the coiled supply and thus the armature of the motor to effect the saturation. As seen in the graph of FIG. 2, the range of armature voltage $E_g$ (along the ordinate of the graph of FIG. 2) and the range of speed $\omega$ of a coil of material (along the abscissa) to complete the pay off of material for nonsaturation, moderate reductions of the material, utilizing predetermined amounts of current $I_f$ and fluxes $\phi$ in the field of a drive motor, lie outside (to right in FIG. 2) of the area of "saturation." The area for moderate reduction in FIG. 2 is shaded or hatched. As the material pays off and the rate of rotation $\omega$ of the armature increases, a constant tension is needed on the material for the reasons discussed above. This can be provided by the control system discussed earlier (and in detail hereinafter) in which a counter EMF is developed and applied to the motor field to offset an increasing voltage of the armature. In FIG. 2, the curves indicate appropriate decreases in field current and magnetic flux that maintain $E_g$ constant during the increasing speed $\omega$ of a coil paying off material.

However, continuing with FIG. 2, when the rotation $\omega$ of the coil and armatures slows beyond the "saturation" current and flux for the drive motor, i.e., to the left of the saturation curves in FIG. 2, the control effected by the above arrangement ceases, as there are now no current and flux values in the field available for control to maintain armature voltage $E_g$ constant. Thus, $E_g$ falls along the slope of the saturation curves toward a zero voltage level for a zero rotational speed. This condition requires control of a drive motor in a manner that heretofore, we believe, has not been accomplished. In the present invention it is accomplished, broadly, by offsetting the loss of armature voltage $E_g$ with an equal but opposite amount of current ($I_a$) for the armature.

More particularly, the horsepower of motor 4 can be stated by the equation $$H_p = (F \cdot v_s / 60 \cdot 550)$$

where F is the mechanical force (in pounds) delivered to the sheet 6 (in FIG. 3), and $v_s$ is the velocity (in ft/min) of sheet 6 that is being supplied to the rolling mill 10. Since one horsepower is 550 ft. lbs. per second, and there are 60 seconds in a minute, the product of F and $v_s$ is divided by the product of 60 and 550.

The product of F and $v_s$ is essentially also the product of armature current ($I_a$) and voltage ($E_g$). Hence, horsepower can also be stated as follows:

$$H_p = E_g \cdot I_a / 746$$

using the numerical constant 746 to convert mechanical horsepower to electrical power in watts.

Combining the above equations, the following equation is obtained:

$$F \cdot v_s / 60 \cdot 550 = E_g \cdot I_a / 746$$

or, $$F = 44.4 E_g \cdot I_a / v_s$$

using 44.4 (the quotient of 60·550÷746) to relate the pounds foot per minute of $F \cdot v_s$ and the watts of $E_g I_a$ to maintain F in pounds. This equation can now be reduced to $$F = 44.4 E_g I_a / v_s = 44.4 [E_g / v_s] I_a$$

Thus, the two functions $E_g/v_s$ and $I_a$ can be used to offset each other in the process of maintaining a constant force F on the sheet as the coil 6 changes diameter and speed. And since armature voltage and current comprise the horsepower of the motor, control of $I_a$ is available to provide a constant power output for motor 4 when control of $E_g/v_s$ is lost due to saturation of the field. This is accomplished in the following manner.

The speed of mill 10 (and the material 6 entering the mill) is, in FIG. 3, measured by a tachometer 12, and 12 outputs a signal representing this speed to a controller 14. (Controller 14 is a device that is commercially available and is employed as a counter emf circuit for motor power supplies in a manner explained hereinafter). The controller 14 also receives the measurement of voltage $v_t$ from the terminals of armature 8 and power supply 16 which, as indicated above, is speed related. The controller 14 then estimates the armature voltage $E_g$ by subtracting the voltage dropped across the armature resistance and inductance. This voltage $E_g$ tends to increase as the armature and coil increase in rotational speed because of the decreasing diameter of the coil that takes place in the process of paying off material to mill 10. The controller, however, continuously compares the measurement of entry speed (from 12), as the speed of the armature increases, to the voltage $E_g$ estimated from the voltage measured across armature 8, and continuously regulates the current supplied to field 2, via continuous adjusting of a field supply 18, to minimize the difference between the signal from tachometer 12 and the armature voltage $E_g$. Controller 14 thereby holds the ratio $E_g/v_s$ constant. Armature current is maintained constant in a manner presently to be explained. In this manner, for normal reductions in the gauge of the material 6 in mill 10 constant power output of motor 4 and constant force F are provided on material 6 entering the mill while the rotational speed of the coil material is increasing. The controller 14 can control field current in the above manner by controlling the firing angle of SCRs, for example, in supply 18.

Power is supplied to armature 8 by supply 16 and current flow in the armature is initially set for a chosen production schedule of the material 6 in mill 10. This can be accomplished by an operator using a set point control 22, as shown diagrammatically in FIG. 3. This setting (and armature current) determines the force exerted on material 6 as the material is paid off from the coil. The setting chosen at 22 provides a reference level or value of current for control of current ($I_a$) in armature 8. This reference level of current is maintained automatically by a current sensing arrangement 20, which feeds back current information to supply 16 to maintain armature current constant.

A conventional means of controlling the exit sheet thickness from the mill 10 is through the regulation of the back or payoff tension of a mill; e.g., a decrease in payoff tension will result in an increase in the exit sheet thickness of the material in the rolling process. Likewise, the inverse is true. A suitable device for physically sensing the thickness of the material exiting the mill is an x-ray gauge 26. 26 provides a signal that is fed to a guage controller 24 where a deviation payoff tension reference is established. The invention easily accepts the deviation tension reference, sums it to the normal tension reference set by the controller 22 and continuously computes, at 28, the unwind armature current $I_a$ required for the summed tension references.

When heavier than normal reductions are taken on material 6 in mill 10, as explained earlier, the speed of travel of the material from the coil is slowed to the extent that the iron of field 2 of motor 4 saturates. The voltage $E_g$ in the armature for a range of unwind speeds $\omega$ that reflects saturation falls, as indicated in FIG. 2, to a value lower than that occurring with range of armature speeds for ordinary or moderate reductions. It will be recalled that controller 14 controls the supply 18 of motor field 2 in accordance with the contemporaneous speed of the mill and the voltage measured across the armature, the armature voltage being now substantially lower. 14 thus tries to increase the current flowing in the windings of the field, via control of field supply 18, to restore armature voltage. However, the iron of the field is now saturated with magnetic flux, so that this method of maintaining horsepower and the force on material 6 constant is not effective. The invention, rather, employs a circuit means 28, such as an analogue computer, connected between power supply 16 and the set point control 22, to calculate the inverse $[(v_s/E_g)]$ of the function $[(E_g/v_s)]$ established by 14. As seen in FIG. 3, circuit means 28 is connected to receive the same signals ($V_t$ and $v_s$) as controller 14. However, as an alternative to using voltage $V_t$ to indicate the voltage $E_g$ of armature 8, a tachometer (not shown in FIG. 3) mechanically connnected to the shaft of the motor can be used to indicate armature voltage $E_g$ during the period that the field is saturated. In either case, power supply 16 is controlled to increase armature current ($I_a$) by the amount of the decrease in armature voltage $E_g$, due to the saturation of field 2, to continue the proper amount of force on sheet 6 and constant power output of the motor, the power being the product of armature voltage $E_g$ and current $I_a$. Thus, by increasing $I_a$ in inverse proportion to the decrease in $E_g$ occurring in 14, power output of the motor is maintained constant. Or, mathematically, $[(E_g/v_s)] [(v_s/E_g)]I_a$ is the function and calculation performed by circuit means 28 in maintaining constant force on the material being paid off when the field of motor 4 saturates.

Continuing with the case of paying off material from coil 6, as the radius of the coil decreases, the speed ω of the coil (following the abscissa of FIG. 2) increases, thereby increasing armature voltage $E_g$ (along the ascending angle of the bunched saturation curves in FIG. 2). As voltage increases, circuit 28 functions to decrease armature current by the amount of the voltage increase and at the same rate, so that (again) the power output of the motor is held constant. In this manner, the force on the material 6 continues to be maintained constant until either (1) the coil pays out or (2) the speed ω of the coil and the voltage $E_g$ of the armature moves into the unsaturated speed range (hatched area in FIG. 2), at which time the circuit of FIG. 3 functions to control the force on material 6 by adjusting field current and flux in the manner described earlier.

Figure 4:
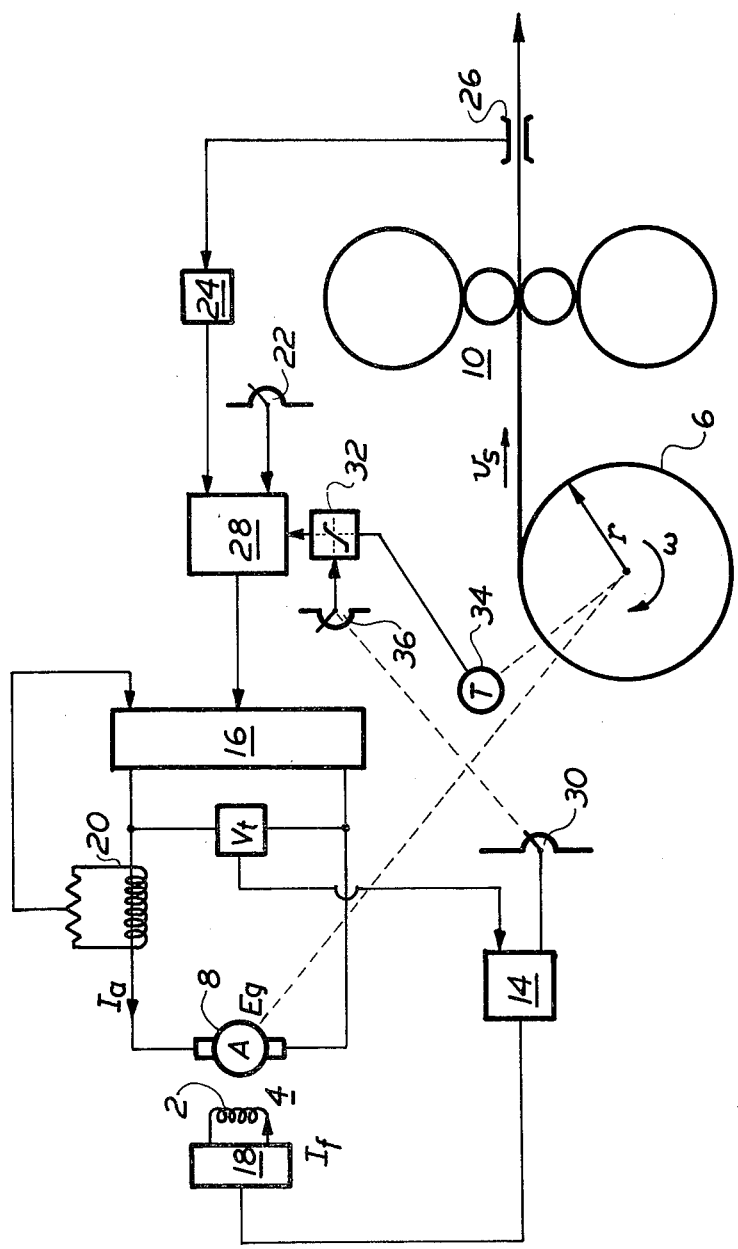
FIG. 4 is a schematic diagram of a second embodiment of the invention.

As indicated earlier, the horsepower of motor 4 can be stated by the equation $$H_p = E_g \cdot I_a / 746 \tag{1}$$

using the numerical constant 746 to convert mechanical horsepower to electrical power in watts. In the embodiment of FIG. 4 of the drawings, as in FIG. 3, a constant tension T, (in pounds per square inch) is maintained on the material being unwound from coil 6 thereof, or stated otherwise, a constant force F (in pounds) is maintained on the material per a given cross-sectional area A of the material that is equal and opposite to the force applied to the material from mill 10. This can be equated as $$T = F/A \tag{2}$$

The horsepower of motor 4 can also be stated as the product of the torque $T_g$, (in ft-lbs) times the rotational speed ω (in revolutions per minute) as follows:

$$H_p = T_g \cdot \omega / 5250 \tag{3}$$

with 5250 ft-lbs/min. being the rate of applied torque at the shaft of the motor equal to one horsepower. The torque ($T_g$) required at the motor shaft to offset the force (F) applied to the material by mill 10 is equated as follows:

$$T_g = F \cdot r \tag{4}$$

r being the radius of coil 6 and also the moment arm of the applied force (F) through which the torque ($T_g$) must be delivered.

Combining the above equations, the following equation is obtained:

$$E_g \cdot I_a / 746 = F \cdot r \cdot \omega / 5250 \tag{5}$$

The rate $v_s$ (in feet per minute) of the material being unwound from coil 6 can be shown as follows:

$$v_s = 2r \cdot \omega \tag{6}$$

Substituting into the above equation and solving for the force (F) provides the equation:

$$F = 44.4 E_g \cdot I_a / v_s \tag{7}$$

using 44.4 to relate the pounds-foot per minute of $Fv_s$ and the watts of $E_g I_a$ to maintain F in pounds. $v_s$ is maintained constant during the complete unwinding process, reflecting the constant speed of the mill, and is only used to establish a coil-to-coil constant factor, the above equation can simply be stated proportionately as follows:

$$F \propto E_g \cdot I_a \tag{8}$$

Thus, the two functions $E_g$ and $I_a$ can be used to offset each other in the process of maintaining a constant force F on material 6 as the coil thereof changes diameter and rotational speed. And since armature voltage and current comprise the horsepower of the motor, control of $I_a$ is available to provide a constant power output for motor 4. This is accomplished in the following manner, using the reference numerals and letters of FIGS. 1 to 3 to refer to like components and functions in FIG. 4.

The armature voltage $E_g$ is not a controlled variable in the embodiment of FIG. 4 and is allowed to fluctuate with the rotational speed of armature 8 along the saturated field curve, as shown in FIG. 2. $E_g$ is only limited to a value determined by the designed limitations of motor 4 and power supply 16.

In operation, a limit value is provided for controller 14 using a set point control 30. The value and setting chosen at 30 provides a reference level or value of armature voltage to be controlled by means of the current ($I_f$) in motor field 2. As in FIG. 3, controller 14 also receives the measurement of voltage $V_t$ from the terminals of armature 8 and armature power supply 16, and this voltage tends to increase as the armature and coil increase in rotational speed because of the decreasing diameter of the coil that takes place in the process of paying off material 6 to mill 10. When the armature voltage reaches the limit set at 30, the controller continuously compares this limit to the measured voltage $V_t$, and continuously regulates the current supplied to field 2, via continuous adjustment of field supply 18, to minimize the difference between the limit reference set at 30 and the measured voltage $V_t$. During the period that the measured voltage is below that of limit 30, controller 14 is limited at its saturated reference, allowing a decrease in armature voltage with a decrease in rotational speed of the motor. Deviation from the standard counter emf function of regulator 14 in providing constant armature voltage $E_g$ for various speeds of mill 10 will be presented further into this description.

As indicated above, the present invention lies in the use of a constant tension (or force) controller (computer) 28. Controller 28 provides the unwinding process with the means to utilize a reference tension level (set at 22), continuously monitor the armature voltage of the unwind motor, and make the necessary corrective adjustments in the unwind armature current to satisfy the proportional relationship of force, volts and amps, as seen in equation (8). Solving for armature current equation 8 is rearranged to read:

$$I_a \propto = F/E_g \tag{9}$$

The level of force required or wanted is set by a control setting 22. This control setting will be later shown to be the actual sheet tension level setting. Controller 28 also receives an armature voltage setting $E_g$ from a limit controller 32, the function of which will presently be explained. Controller 28 continuously computes the function of the referenced constant force F level from the set point 22 divided by the armature voltage $E_g$, and equates the result to the armature current $I_a$ reference to maintain the desired constant force on material 6. The actual current $I_a$ in armature 8 is conventionally established and automatically controlled by power supply 16 comparing the referenced armature current $I_a$ from controller 28, and the actual current fed back through current sensing circuit 20.

For more accurate means of providing a constant force F, we see above the need for the actual armature voltage $E_g$ which, as explained earlier, is internal to the motor. In FIG. 2, during the period of time when the rotational speed of the motor is slowed to the point that the motor field current $I_f$ is saturated, the armature voltage $E_g$ is proportional to the motor speed. In FIG. 4, controller 32 provides controller 28 with a voltage signal representative of armature voltage $E_g$. This is accomplished by proportionalizing the rotational speed of armature 8, as measured by means of a tachometer 34 mechanically attached to coil 6. The output of controller 32, which representative of the armature voltage is set at the same set point as controller 14 by means of a set point control 36 ganged to 30. This limit on controller 32 provides a constant, rated armature voltage feedback signal while controller 14 is maintaining a constant voltage on the motor armature 8 by the means of regulation of the field current $I_f$. Readily, the use of the $E_g$ voltage versus the $V_t$ voltage can be seen by the following equation for motor power:

$$I_a \cdot E_g = V_t I_a + I_a^2 \cdot R \tag{10}$$

where the $I_a \cdot E_g$ term is the actual power generated by the motor, the $V_t \cdot I_a$ term is the power delivered from the motor to the power supply (because of the generator action of an unwind motor) and the $I_a^2 \cdot R$ term is the resistive power losses of the motor. Since the actual motor power is delivered to the material 6 in the form of the product of tension and material velocity, and the purpose of this invention is to regulate armature current ($I_a$), the $E_g$ voltage representative from controller 32 is aso used to negate the $I_a^2 R$ losses of the motor armature in providing constant motor power in relation to sheet tension. This embodiment then corrects for both the saturated field condition and IR losses in the armature. The conventional counter-emf tension control maintains constant power through constant $I_a$ current and the regulation of the terminal voltage $V_t$ to a level proportional to the speed of mill 10. With the armature current $I_a$ constant, the $I_a^2 R$ term is also constant and is nominally a constant subtracted in any subsequent tension calculation from the measured motor variables.

Generally, in the operation of a rolling mill, such as 10, other inputs to controller or computer 28 would include set points for sheet width control, exit sheet gauge control, and an exit sheet speed signal generated from the rotational speed of mill 10. Consequently, controller 28 would use the following equation to establish the armature current reference, the equation being formulated from the above equations (2) and (7):

$$I_a = (T \cdot W \cdot G_{in} \cdot K_{in})/(44.4 \cdot E_g) \tag{11}$$

where the cross-sectional area A of the sheet is formulated by the product of W (width) and $G_{in}$ (entry gauge). Equating mass flow of the material through the mill 10

$$W \cdot G_{in} \cdot K_{in} = W \cdot G_{out} \cdot K_{out} \tag{12}$$

and substituting back into equation (11)

$$I_a = (T \cdot W \cdot G_{out} \cdot K_{out})/(44.4 \cdot E_g) \tag{13}$$

These variables are not shown in the drawing figures, as they remain constant during the run of a complete coil, and are only used to initially establish the magnitude of the $I_a \cdot E_g$ product for the tension referenced through set point 22.

While the invention has been described in terms of preferred embodiments, the claims appended hereto are intended to encompass all embodiments which fall within the spirit of the invention.

Having thus described my invention and certain embodiments thereof, we claim:

1. A method of providing constant tension on a strip of material being wound on or unwound from a coil of material driven by the armature of a DC motor, the method comprising the steps of supplying the armature with electrical power, measuring a physical characteristic of the material being wound or unwound, utilizing this measurement to establish a predetermined level of current flow in the circuit of the armature, continuously measuring the voltage across the armature of the motor, continuously measuring the rate of travel of material being wound or unwound, and developing from the combination thereof a counter voltage for the field of the motor that functions to offset changes in the voltage of the armature, continuously directing said counter voltage to the field, and increasing the current in the armature by an amount corresponding to the reduction of armature voltage when the speed of rotation of the armature is decreased to the extent that the field of the motor becomes saturated, the increase in armature current being effective to maintain the power output of the motor constant, and thus provide constant tension on the strip of material being wound or unwound from the coil driven by the motor.

2. A system for controlling the torque delivered to the shaft of a DC motor by a rotatable armature of the motor, the field of the motor being subject to saturation when the speed of the rotation of the armature is reduced a predetermined amount, the system comprising circuit means for measuring the current and voltage in the circuit of the armature, and for providing a counter voltage for the field of the motor based upon the measurement of said armature current and voltage, and circuit means adapted to increase the current in the armature by an amount corresponding to a decrease in armature voltage caused by a decrease in the speed of rotation of the armature to the extent that the field of the motor becomes saturated, the increase in armature current being effective to maintain the power output of the motor constant and to provide a predetermined amount of torque delivered to the shaft of the motor.

3. The system of claim 2 in which the circuit means providing the increase in armature current functions to provide a decreasing armature current in proportion to an increasing armature voltage accompanying increasing speed of rotation of the armature.

* * * * *